United States Patent [19]
Sakamoto et al.

[11] Patent Number: 5,471,100
[45] Date of Patent: Nov. 28, 1995

[54] LINEAR ELECTROMAGNETIC DRIVING APPARATUS AND USE OF SAME FOR LENS ADJUSTMENT

[75] Inventors: Satoshi Sakamoto; Shinichi Orimo, both of Tokyo, Japan

[73] Assignee: Sony Corporation, Tokyo, Japan

[21] Appl. No.: 219,474

[22] Filed: Mar. 29, 1994

[30] Foreign Application Priority Data

Mar. 30, 1993 [JP] Japan ................... 5-093856

[51] Int. Cl.$^6$ ................... H02K 41/02
[52] U.S. Cl. ........... 310/12; 354/195.2; 359/824
[58] Field of Search ................... 310/12, 13, 14; 318/135; 354/400, 195.12; 359/824

[56] References Cited

U.S. PATENT DOCUMENTS

| | | | |
|---|---|---|---|
| 4,808,955 | 2/1989 | Godkin et al. | 335/222 |
| 4,831,290 | 5/1989 | Clauss et al. | 310/12 |
| 5,182,481 | 1/1993 | Sakamoto | 310/13 |

FOREIGN PATENT DOCUMENTS

| | | |
|---|---|---|
| 0153459 | 9/1985 | European Pat. Off. . |
| 0469532 | 2/1992 | European Pat. Off. . |
| 0485302 | 5/1992 | European Pat. Off. . |

*Primary Examiner*—Steven L. Stephan
*Assistant Examiner*—Judson H. Jones
*Attorney, Agent, or Firm*—William S. Frommer; Alvin Sinderbrand

[57] ABSTRACT

A linear electromagnetic driving apparatus includes a substantially rectangular tube-shaped magnetic yoke comprised of outer and inner frame plates spaced apart to form a gap with at least one magnet secured to an outer or inner frame plate to generate magnetic flux. A bobbin supporting a coil which extends in a direction parallel to the longitudinal axis of the magnetic yoke is positioned in the gap. A driven member is secured to and coaxial with the bobbin and has openings to receive the inner frame plates of the yoke such that when the coil is energized to move the bobbin in the gap, the inner frame plates extend into and through the bobbin and into and through the openings of the driven member. A fixed shaft extends parallel to the longitudinal axis of the yoke; and a bearing secured to the bobbin structure and extending outwardly therefrom receives and is slidable on the fixed shaft. At least one of the corners formed on the rectangular tube-shaped yoke is cut out to define an open portion through which the bearing passes so as to be unobstructed as the bobbin slides within the yoke.

39 Claims, 13 Drawing Sheets

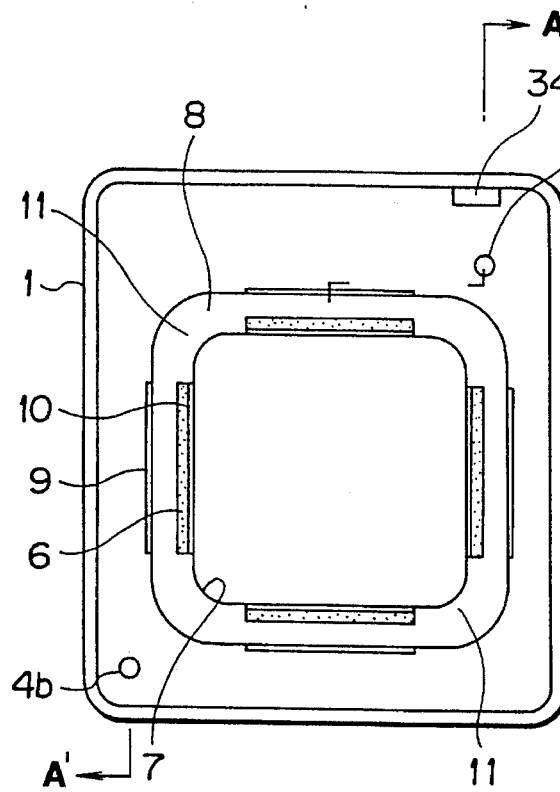
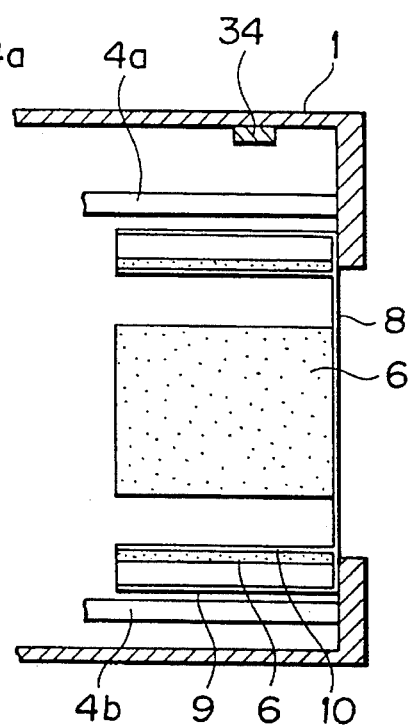
FIG.6A　　FIG.6B
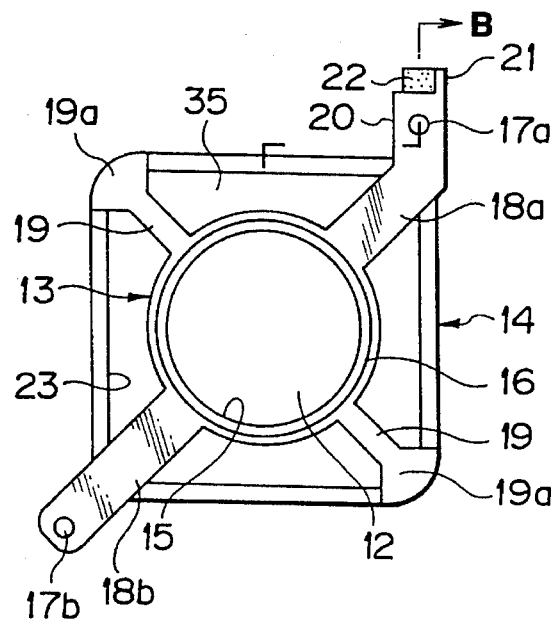
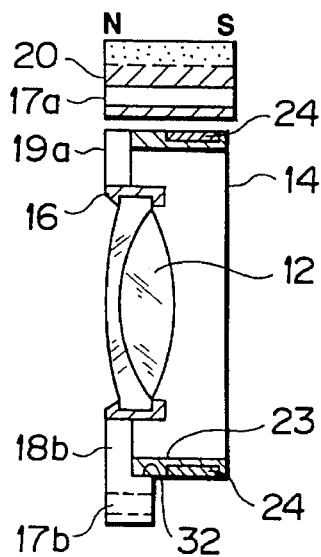
FIG.7A　　FIG.7B

LINEAR ELECTROMAGNETIC DRIVING APPARATUS AND USE OF SAME FOR LENS ADJUSTMENT

This invention relates to electromagnetic driving apparatus and, more particularly, to such apparatus which exhibits compact size, is of light weight and finds ready application in a camera to adjust the lenses therein, such as for zooming and/or focusing purposes.

BACKGROUND OF THE INVENTION

Motor-driven lenses for zooming and/or focusing have been designed for photographic cameras, video cameras, electronic still cameras, and the like. In one arrangement, a motor is used to drive a worm screw on which is mounted a lens holder, resulting in bidirectional movement of the lens. This structure is relatively large, bulky, heavy and complex; and typically is used to provide gross movements (as opposed to fine movements) of the lens. Consequently, apparatus of this type has been used heretofore to implement a motor-driven zoom operation, but typically not a motor-driven focusing operation.

Other motor-drive arrangements which can be used both for zooming and focusing employ what has come to be known as a voice coil motor. One example of a motor-driven lens assembly which incorporates a voice coil motor is described in U.S. Pat. No. 5,220,461, assigned to the assignee of the present invention. Another example of a motor-driven lens assembly which incorporates a voice coil motor is illustrated in accompanying FIGS. 1 and 2. This assembly finds particular application in the lens barrel of a video camera, such as the type shown in FIG. 3. In the lens assembly of FIG. 1, a fixed lens, referred to as a forward lens unit 120, cooperates with a zoom lens 121 which is driven by a stepping motor 122. An image from zoom lens 121 passes through a diaphragm unit 123 to a focusing lens unit 125. The combination of zoom lens 121 and diaphragm 123 typically is referred to as a zoom unit 126. Focusing unit 125 is comprised of a fixed lens 124, a movable unit 103 which includes a lens whose position is adjusted to effect proper focusing and a fixed unit 102 supported within a casing 101. Units 102 and 103 in combination comprise a voice coil motor, as will be described. Movable unit 103 includes bearing members slidable on shafts 104a and 104b which are mounted in casing 101 and extend in a direction parallel to the longitudinal axis of the voice coil motor.

Stepping motor 122 is used to vary the position of zoom lens 121 over a relatively wide range so as to effect a zoom function to provide both telephoto and wide-angle imaging. The range of movement of unit 103 is relatively small in comparison to that of stepping motor 122, thus facilitating the use of a voice coil motor to effect focusing adjustments.

As illustrated more particularly in FIG. 2, fixed unit 102 of the voice coil motor is disposed in casing 101 and constitutes a stator structure. Movable unit 103 mates with the stator structure an is slidable on shafts 104a and 104b in the axial direction (i.e. along the longitudinal axis) of this structure. As illustrated, the stator structure is comprised of two sets of frame plates 109 and 110 which are referred to herein as outer and inner frame plates, respectively. Inner frame plate 110 is configured as a substantially rectangular tube and outer frame plates 109 are formed of rectangular plate members spaced from and parallel to the walls of the inner frame plates. A rectangular connecting plate 108 has outer frame plates 109 extending therefrom, these outer frame plates being bent by 90° and, thus, are perpendicular to connecting plate 108. Inner frame plates 110 are secured to connecting plate 108 such that a magnetic flux path is provided from, for example, outer frame plate 109 through connecting plate 108 to inner frame plate 110. The connecting plate is provided with a central opening 107 of rectangular shape concentric with the interior of the rectangular tube defined by inner frame plates 110. Preferably, a rectangular-shaped magnet 106 is secured to each of outer frame plates 109. In the illustrated embodiment, the surface of an outer frame plate 109 which faces the surface of an inner frame plate 110 has magnet 106 secured thereto, as by a suitable cement. Stated otherwise, a magnet 106 is secured to an inner surface of an outer frame plate 109 and is spaced from an outer surface of an opposite inner frame plate 110 so as to define a gap between the magnet and the inner frame plate. Each of magnets 106 is polarized in the direction of its thickness so that magnetic flux traverses the path from the magnet to inner frame plate 110 through connecting plate 108 to outer frame plate 109 and then to magnet 106.

Movable unit 103 is formed of a lens holding frame 112 to which is secured a bobbin 113 having a coil 118 wound thereon so as to extend in the axial direction, as illustrated. The lens holding frame may be of metal to which a frame support 114 is secured. The frame support and lens holding frame may be of integral construction or may be formed as separate pieces suitably bonded together. Frame support 114 is a rectangular plate having a center opening which is at least coextensive with the diameter of a lens 111 mounted on and supported by a cylindrical tube 115 which, in turn, is supported by frame support 114. A pair of bearings 116a and 116b is secured to tube 115, the bearings extending radially outward to receive shafts 104a and 104b, respectively. The combination of frame support 114 and tube 115 constitute lens holding frame 112 which is slidable on shafts 104a and 104b. Since bobbin 113 is secured to lens holding frame 112, the bobbin also is slidably movable in the axial direction of the illustrated assembly. Bearings 116a and 116b are provided with through-holes 117a, 117b, respectively, through which pass shafts 104a and 104b.

Bobbin 113 is formed of a synthetic resin and is shaped as a substantially rectangular tube having a rectangular central hollow section herein. The bobbin is formed with a peripheral winding slot in which coil 118 is wound. It is appreciated that the rectangular tube-shaped bobbin fits within the gap between magnets 106 and inner frame plates 110 of the stator structure such that the coil passes through the magnetic flux which is generated in the gap by magnets 106. Thus, inner frame plates 110 fit within the central hollow section of bobbin 113 and the bobbin itself fits within the gap between the inner frame plates and magnets 106.

Coil 118 is coupled to suitable connectors (not shown) so that driving current may be supplied thereto. Depending upon the direction of this current, a force proportional to the magnitude of the current and the magnetic flux from magnets 106 is exerted on the coil, thereby sliding coil 118, bobbin 113 and lens holding frame 112 in the corresponding direction. That is, as a result of the current supplied to the coil, movable unit 103 is driven axially relative to fixed unit 102.

However, the limits of the bidirectional axial movement of movable unit 103 are constrained by the abutment of the free end of bobbin 113 against connecting plate 108 and also the abutment of the free, or forward, end of inner frame plates 110 against frame support 114. It is important that coil 118 always is positioned within the gap between magnets 106 and inner frame plates 110 and does not extend forwardly thereof. Consequently, axial movement of movable unit 103 is constrained by the axial length h of frame support 114. To permit a larger range of movement and, thus, a greater degree of focus adjustment, the axial length h must be increased or, alternatively, the axial length of bobbin 113 must be increased such that the coil extends deeper into the gap between magnets 106 and inner plates 110. Of course, to provide greater axial movement of movable unit 103, it is necessary to increase the axial length of fixed unit 102. Hence, the overall length of the motor-driven lens assembly using the voice coil motor arrangement shown in FIG. 2 and, thus, the overall axial length of the lens barrel in which this arrangement is disposed, becomes greater if the range of adjustment is to be increased. As a result, the weight of the adjustable lens assembly likewise is increased.

Moreover, in the arrangement shown in FIG. 2, the free or forward ends of outer frame plates 109 and inner frame plates 110 must remain opened to permit coil 118 to move within the gap therebetween. That is, the forward end of the gap cannot be closed. Consequently, it is not possible for the free or forward ends of the inner and outer plates to be magnetically connected in a low reluctance magnetic path, such as the low reluctance path provided by a plate similar to connecting plate 108. Accordingly, the magnetic flux path within the stator structure is unidirectional, that is, it extends in only one direction in each of outer plates 109 and likewise extends in only one direction in each of inner plates 110, thus reducing the magnetic efficiency of the stator structure. To improve this magnetic efficiency, the inner and/or outer plates must be made thicker, resulting in an overall arrangement that is larger in size and greater in weight.

OBJECTS OF THE INVENTION

Therefore, it is an object of the present invention to provide improved electromagnetic driving apparatus of reduced overall size and weight and having particular application in a motor-driven lens assembly to effect focusing and/or zooming of the lens elements.

Another object of this invention is to provide apparatus of the aforementioned type which, for a given size and weight, permits a greater range of movement, thus permitting a greater range of lens adjustments.

A further object of this invention is to provide apparatus of the aforementioned type having a stator structure of improved magnetic efficiency which, nevertheless, is of relatively compact size and lightweight.

An additional object of this invention is to provide apparatus of the aforementioned type for adjusting the lens of a camera, resulting in a camera of compact size and reduced weight.

Various other objects, advantages and features of the present invention will become readily apparent from the ensuing detailed description and the novel features will be particularly pointed out in the appended claims.

SUMMARY OF THE INVENTION

In accordance with this invention, linear electromagnetic driving apparatus is provided with a stator which includes a substantially rectangular tube-shaped magnetic yoke comprised of inner and outer frame plates that are spaced from each other to form a gap therebetween, with a connecting member to provide a magnetic flux path between the inner and outer frame plates. At least one magnet is secured to a respective one of the inner and outer frame plates to generate the magnetic flux. A bobbin is positioned within the gap between the inner and outer frame plates and has a coil wound thereon to extend in a direction parallel to the longitudinal axis of the rectangular tube-shaped yoke. A driven member secured to and coaxial with the bobbin has openings to receive the inner frame plates of the yoke such that when the coil is energized to move the bobbin in the gap, the inner frame plates extend into and through the bobbin and into and through the openings of the driven member. Bearing elements are secured to the structure formed of the bobbin and driven member and extend outwardly to receive a fixed shaft, thereby permitting the structure to slide in the axial direction. At least one of the corners of the rectangular tube-shaped yoke is cut out to define an open portion through which the bearing elements pass.

Preferably, an annular frame member is coupled to end portions of the inner and outer frame plates remote from the connecting member so as to provide a magnetic flux connection and establish a magnetic flux path between the inner and outer frame plates. Consequently, flux passes through each of the inner and outer frame plates in two directions, thereby improving the magnetic efficiency of the stator structure.

In one embodiment, a position detector is coupled to the movable structure formed by the bobbin and driven member, thus permitting the position of the movable structure relative to the stator to be detected. Preferably, the position detector comprises a magnet and a sense coil, one of which is fixed and the other of which is secured to a bearing element to be positioned externally of the rectangular tube-shaped yoke. In a preferred arrangement, the sense coil is fixedly positioned externally of the rectangular tube-shaped yoke and the magnet of the position detector is secured to the bearing element opposite the sense coil and movable therepast.

As a feature of this invention, the outer frame plates form in end view, a substantially rectangular outer frame structure and the inner frame plates form, in end view, a substantially rectangular inner frame structure. If one inner frame plate and one outer frame plate are considered to form a respective pair, one magnet is secured to one surface of each pair of frame plates. Preferably, the magnet is disposed in the gap between the inner and outer frame plates of a pair, with one surface of the magnet being secured to one of the frame plates, such as the outer frame plate, and the other surface of the magnet facing the other frame plate of the pair.

As a feature of this invention, if each magnet exhibits a thickness $L_m$ (mm), a length $W_m$ (mm) extending in a direction parallel to the longitudinal axis and a residual flux density $B_r$ (Tesla) if the gap ha a length $L_g$ (mm), if the average residual flux density of the magnets is $B_{rx}$ (Tesla) and if the average length of the magnets is $W_{mx}$ (mm), then $(L_m/L_g) \times (B_r/B_{rx}) \times (W_m/W_{mx}) \geq 0.05$. In one described embodiment, $B_{rx} = 0.8$ and $W_{mx} = 20$.

As another aspect of this invention, the driven member secured to the bobbin is a lens holding member on which a lens is supported. Advantageously, the lens holding member is suspended from the bobbin in a radially inward direction.

In a preferred application of the present invention, the driving apparatus is incorporated into a camera to effect focusing and/or zooming control over the adjustable lens elements included therein.

BRIEF DESCRIPTION OF THE DRAWINGS

The following detailed description, given by way of example, and not intended to limit the present invention solely thereto, will best be understood in conjunction with the accompanying drawings in which:

FIGS. 6A and 6B are front and sectional views of the stator structure shown in FIG. 4;

FIGS. 7A and 7B are front and sectional views of the movable unit shown in FIG. 4;

DETAILED DESCRIPTION OF A CERTAIN PREFERRED EMBODIMENT

Figure 1:
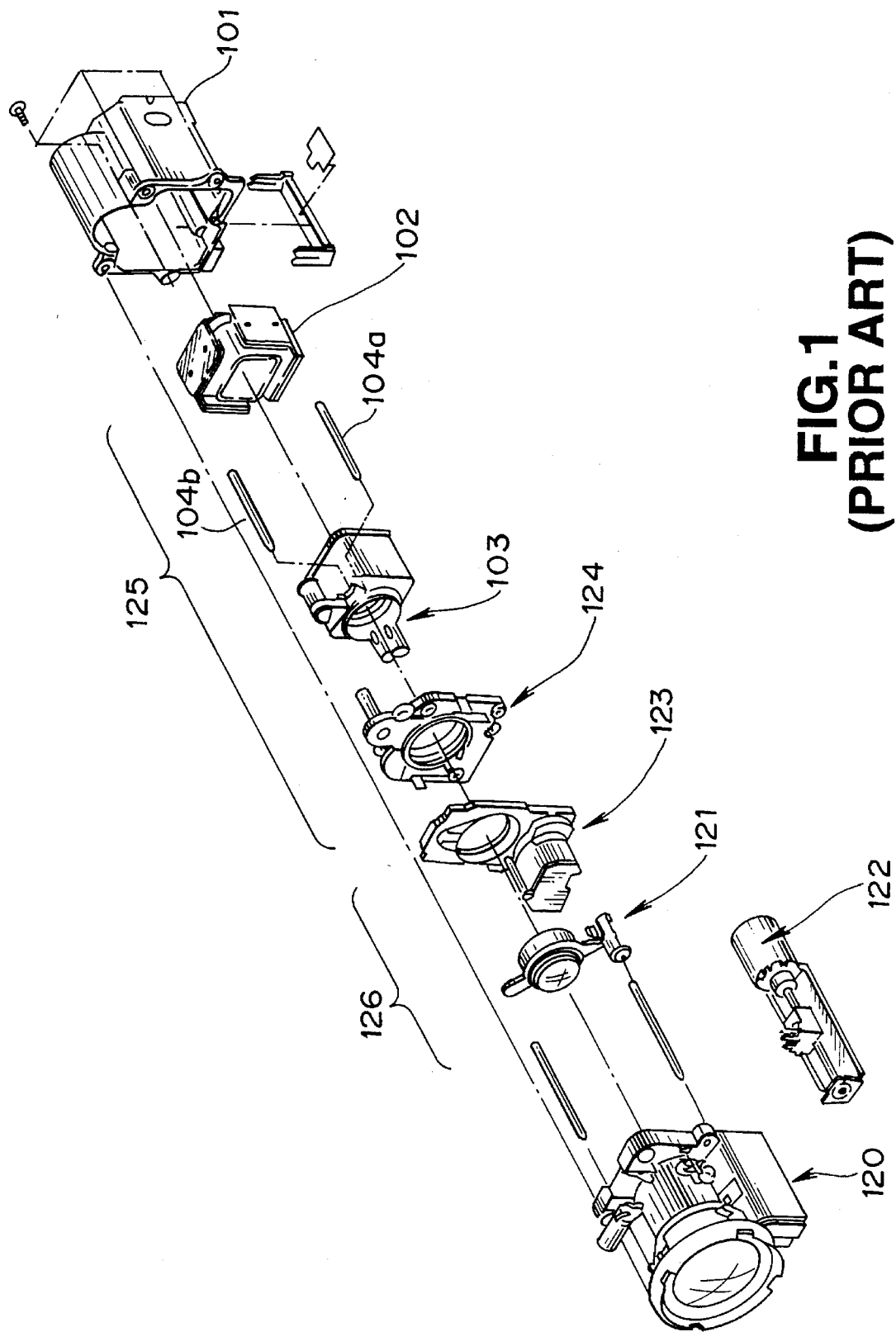
FIG. 1 is an exploded perspective view of a prior art lens assembly developed heretofore for a camera.

Referring now to the drawings, wherein like reference numerals are used throughout, and particularly FIGS. 4, 6A–6B, 7A–7B, 8A–8B and 9A–9B, it will be seen that the electromagnetic driving apparatus is comprised of a fixed unit 2 and a movable unit 3. Fixed unit 2 is mounted in a casing 1 which is secured to other apparatus, such as the lens barrel of the video camera shown in FIG. 5. It will be recognized, however, that casing 1 may be provided in other devices where linear movement is desired, and need not be limited solely to use in connection with a video camera. It also will be appreciated that, if desired, casing 1 may be omitted.

For convenience, the present discussion is directed to the application of the illustrated apparatus to adjust the position of a lens. However, other applications are contemplated and the present invention need not be limited solely to a lens driving arrangement.

Fixed unit 2 comprises a stator structure including a substantially rectangular tube-shaped magnetic yoke comprised of outer frame plates 9, inner frame plates 10 spaced from and facing the outer frame plates to form a gap therebetween, and a connecting plate 8 for connecting the outer and inner frame plates and providing a magnetic flux path therethrough. Preferably, connecting plate 8 and outer frame plates 9 are of unitary construction formed of a suitable magnetic material, and prior to assembly thereof, the outer frame plates may extend as legs from connecting plate 8 and then are bent 90° to the illustrated position. It is seen that the corners which otherwise would be present between adjacent outer frame plates 9 are cut out so as to define an open portion between such adjacent outer frame plates. It also is seen that connecting plate 8 is provided with a substantially rectangular opening 7 and that inner frame plates 10 extend in the axial direction from connecting plate 8 and are located at the edge of opening 7. As a point of reference, connecting plate 8 may be thought of as being in the rearward portion of the rectangular tube-shaped yoke and outer frame plates 9 and inner frame plates 10 extend forwardly of the connecting plate. The inner frame plates form a rectangular tube and the corners of adjacent inner frame plates are cut out to define open portions parallel to the open portions in the outer frame plates.

An outer frame plate 9 and a facing inner frame plate 10 may be thought of as a pair of frame plates; and the spacing between the plates of a pair defines a gap 11. Preferably, gap 11 between each pair of plates is uniform and, thus, each gap exhibits the same gap length. Also, it is preferable that the length of each of the outer frame plates, that is, the length in the axial direction, is equal and the width of all of the outer frame plates likewise is equal. Similarly, the length of all of the inner frame plates 10 is equal and the width of all of these inner frame plates likewise is equal. It is not necessary, however, for the inner and outer frame plates in a pair to have equal lengths and equal widths, although, as will be described, such frame plates do exhibit equal lengths.

Each pair of outer and inner frame plates is provided with a magnet 6. Preferably, each magnet is secured to an outer surface of an inner frame plate, that is, the surface of inner frame plate 10 which faces outer frame plate 9. Also, each magnet is polarized in the direction of its thickness so that a flux path is established from, for example, a magnet 6, an outer frame plate 10 to inner frame plate 9 via connecting plate 8 and then across the gap to return to the magnet. Alternatively, each magnet 6 may be constructed as a plurality of magnets. As another alternative only one pair of magnets (e.g. top and bottom magnets) may be provided.

Front elevational and sectional views of fixed unit 10 mounted within casing 1 are illustrated in FIGS. 6A and 6B, respectively. It is seen that shafts 4a and 4b are mounted within casing 1, extend parallel to the longitudinal axis of the fixed unit and are disposed externally of the rectangular tube-shaped yoke.

Figure 4:
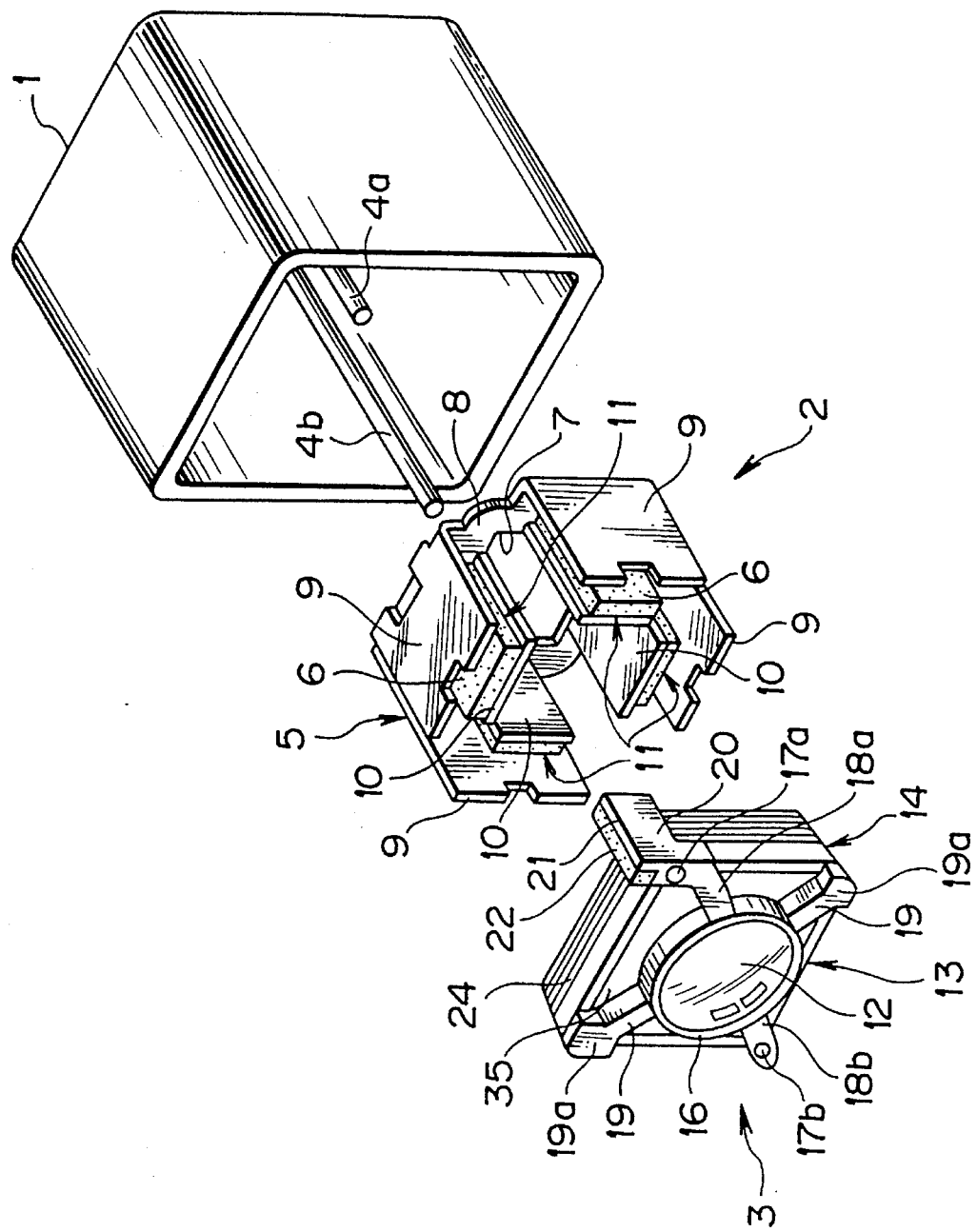
FIG. 4 is an exploded perspective view of a preferred embodiment of the present invention.
Figure 5:
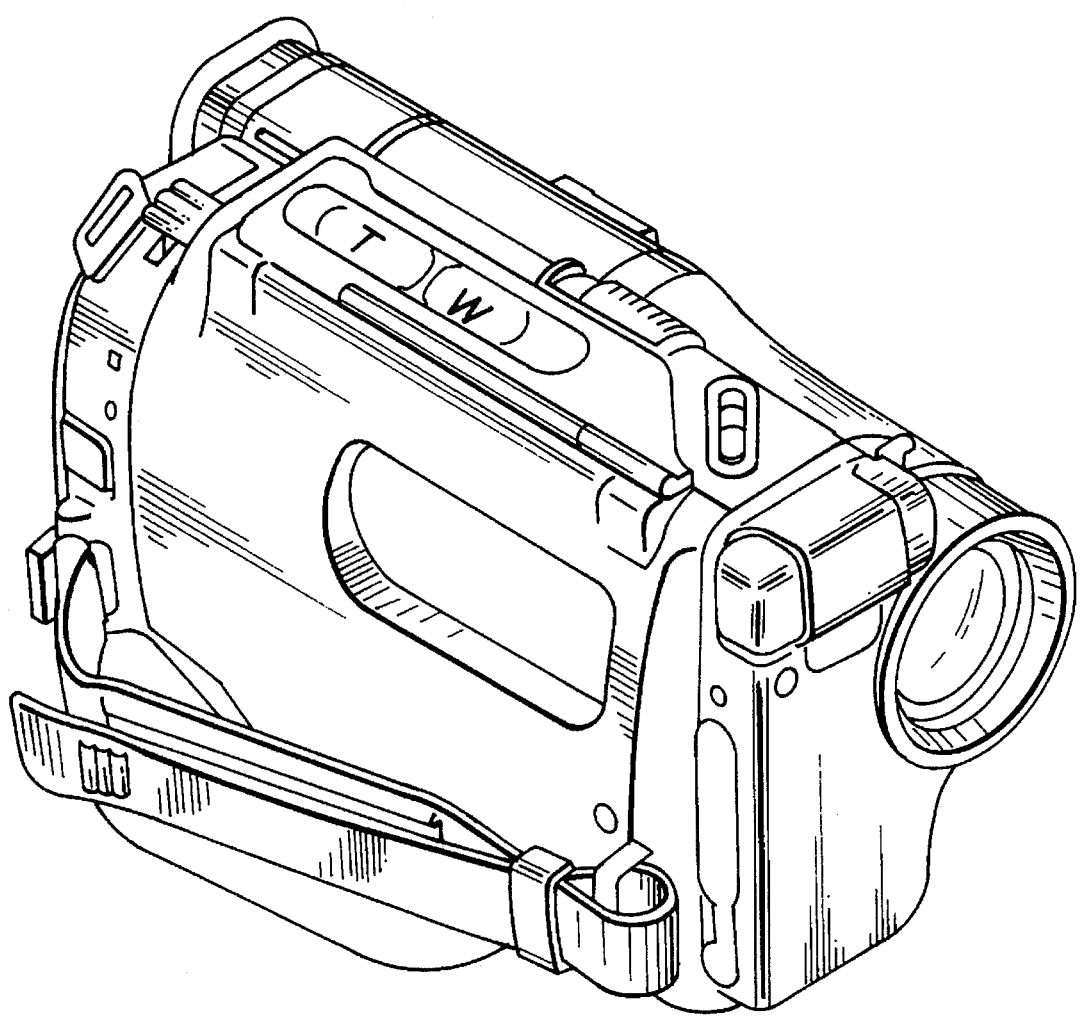
FIG. 5 is a perspective view of a video camera in which the invention shown in FIG. 4 finds ready application.

Movable unit 3, as seen in FIGS. 4 and 7A–7B, is comprised of a bobbin 14 to which a lens holder 13 is secured. The lens holder is suspended from the bobbin in a radially inward direction. Although a lens holder is described herein, it will be appreciated that the lens holder may be replaced by any other driven member, the position of which is to be adjusted. In the illustrated embodiment, however, a lens 12 is secured to lens holder 13 and the latter is formed as an annulus 16, or doughnut. Lens holder 13, and particularly annulus 16, is suspended from bobbin 14 by bearing arms 18a and 18b and by reinforcing legs 19, as will be described.

Bobbin 14 is of substantially rectangular shape having an open interior, or hollow portion 23 (FIG. 7B). The bobbin may be thought of as a rectangular tube whose outer surface is formed with a winding slot in which a coil 24 is wound. As best seen in FIGS. 4 and 7B, coil 24 extends in the winding slot in the axial direction. Bobbin 14 may be constructed of a synthetic resin.

Since lens holder 13 is suspended from bobbin 14 via bearing arms 18a and 18b and reinforcing legs 19, openings 35 are formed between the bobbin and the lens holder, as best seen in FIG. 7A. As will be described below, these openings are adapted to receive inner frame plates 10 and magnets 6 of the rectangular tube-shaped yoke.

Figures 8A, 8B:
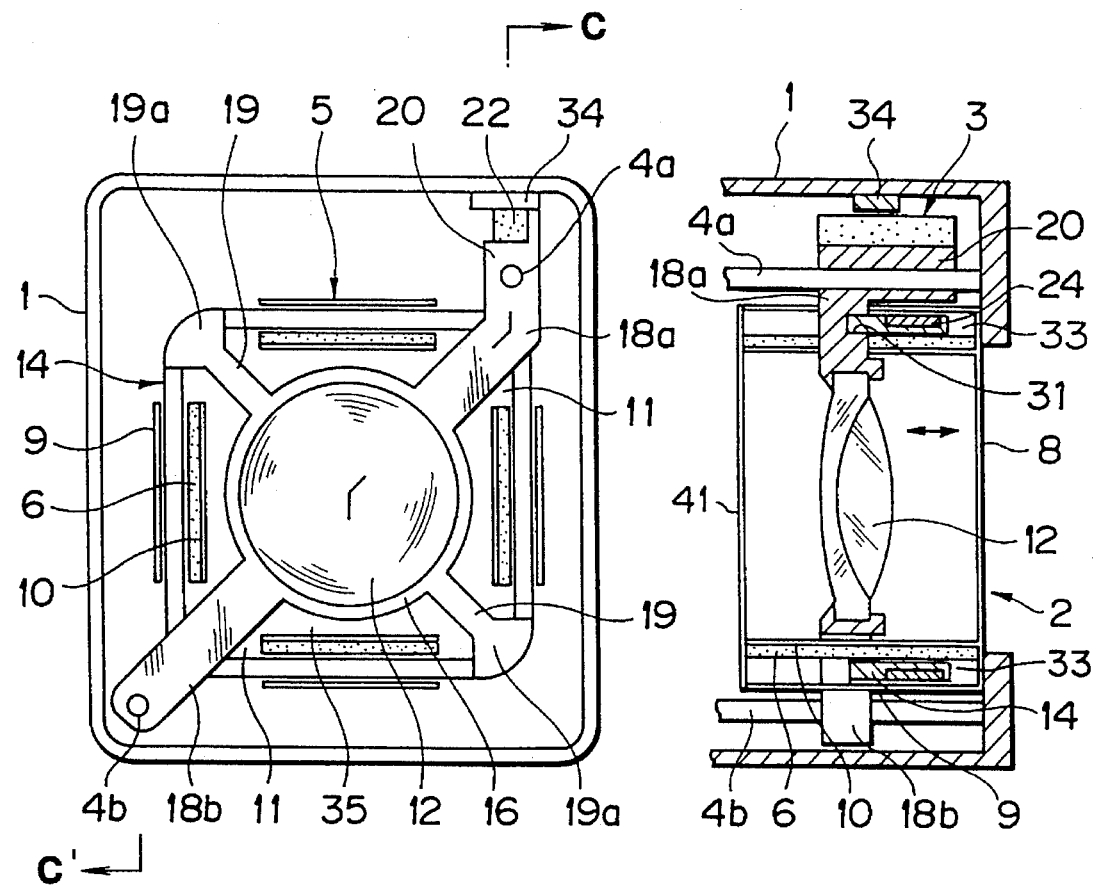
FIGS. 8A and 8B are front and sectional views of the movable unit assembled with the stator of FIG. 4.

Bearing arms 18a and 18b extend radially outward from lens holder 13; and reinforcing legs 19 likewise extend radially outward therefrom. Preferably, the bearing arms and reinforcing legs alternate and are spaced apart one from the other by 90°. Reinforcing legs 19 terminate in mounting portions 19a which are secured to bobbin 14, as shown in FIGS. 4 and 7A. Bearing arm 18a is formed with an L-shaped groove 31 on its rear surface, as best seen in FIG. 8B, and a step 32 having an L-shaped end face is formed on the rear surface of bearing plate 18b, as best seen in FIG. 7B. Groove 31 has a height equal to the thickness of bobbin 14 and the bobbin is inserted into this groove. The bobbin also is seated upon step 32 of bearing arm 18b, as shown in FIG. 7B. It is appreciated that when bobbin 14 and lens holder 13 are assembled, one corner of the bobbin is inserted into groove 31 of bearing arm 18a and the diametrically opposite corner of the bobbin rests upon step 32 of bearing plate 18b. Moreover, the remaining corners of the bobbin contact mounting portions 19a of reinforcing legs 19; and a suitable adhesive, such as a suitable cement, is used to secure the bobbin to the bearing arms and reinforcing legs.

Bearing arms 18a and 18b are provided with throughholes 17a and 17b, respectively, to receive shafts 4a and 4b, such as shown in FIG. 8B. The upper end of bearing arm 18a terminates in a magnet mounting portion 20 which is provided with a ledge to receive a magnet 22. Preferably, the magnet abuts against an upstanding wall 21 of magnet mounting portion 20, as best seen in FIG. 8A. Magnet 22 cooperates with a sense coil 34 to form a position detector for detecting the axial position of lens 12. Sense coil 34, as best seen in FIGS. 8A and 8B, is secured to an inner surface of casing 1 so as to be opposite magnet 22. It will be appreciated that as bobbin 14 slides in the axial direction, thus driving lens holder 13 and lens 12, the axial position of this structure is sensed by sense coil 34 in which a current is induced as magnet 22 moves therepast. Magnet 22 is polarized in its longitudinal direction so that, as the magnet moves past coil 34, the coil senses the movement therepast of alternating north and south poles.

When bobbin 14, to which is secured lens holder 13, is mounted within the magnetic yoke of fixed unit 2, the bobbin and its coil 34 are disposed within the gap between magnets 6 and outer frame plates 9, as best seen in FIGS. 8A and 8B. It is appreciated that magnets 6 and inner frame plates 10 pass easily through openings 35 formed between the bobbin and the lens holder, thereby permitting the bobbin to move axially, as seen in FIG. 8B, with the only constraint on this movement being defined by the abutment of the rear end of bearing arm 18a and the rear end of casing 1. In the absence of this casing, rearward movement of the bobbin is limited by the abutment of the rearward end thereof against connecting plate 8.

It is seen that coil 24 is disposed in the flux within gap 11 of the stator structure. Thus, when drive current is supplied to the coil from a suitable source (not shown), the resultant force exerted on the bobbin, which is proportional to the flux in gap 11 and the magnitude and polarity of the current through coil 24, drives the bobbin and lens holder 13 secured thereto in the forward (outward) or rearward (inward) direction. As mentioned above, as the bobbin moves, magnet 22 moves past sense coil 34, producing a change in flux which is detected by the sense coil and used as a measure of change in position of the bobbin/lens. Since the original position of the bobbin is known, this detection of the change in position is used as a detection of the actual position of the bobbin.

Figure 2:
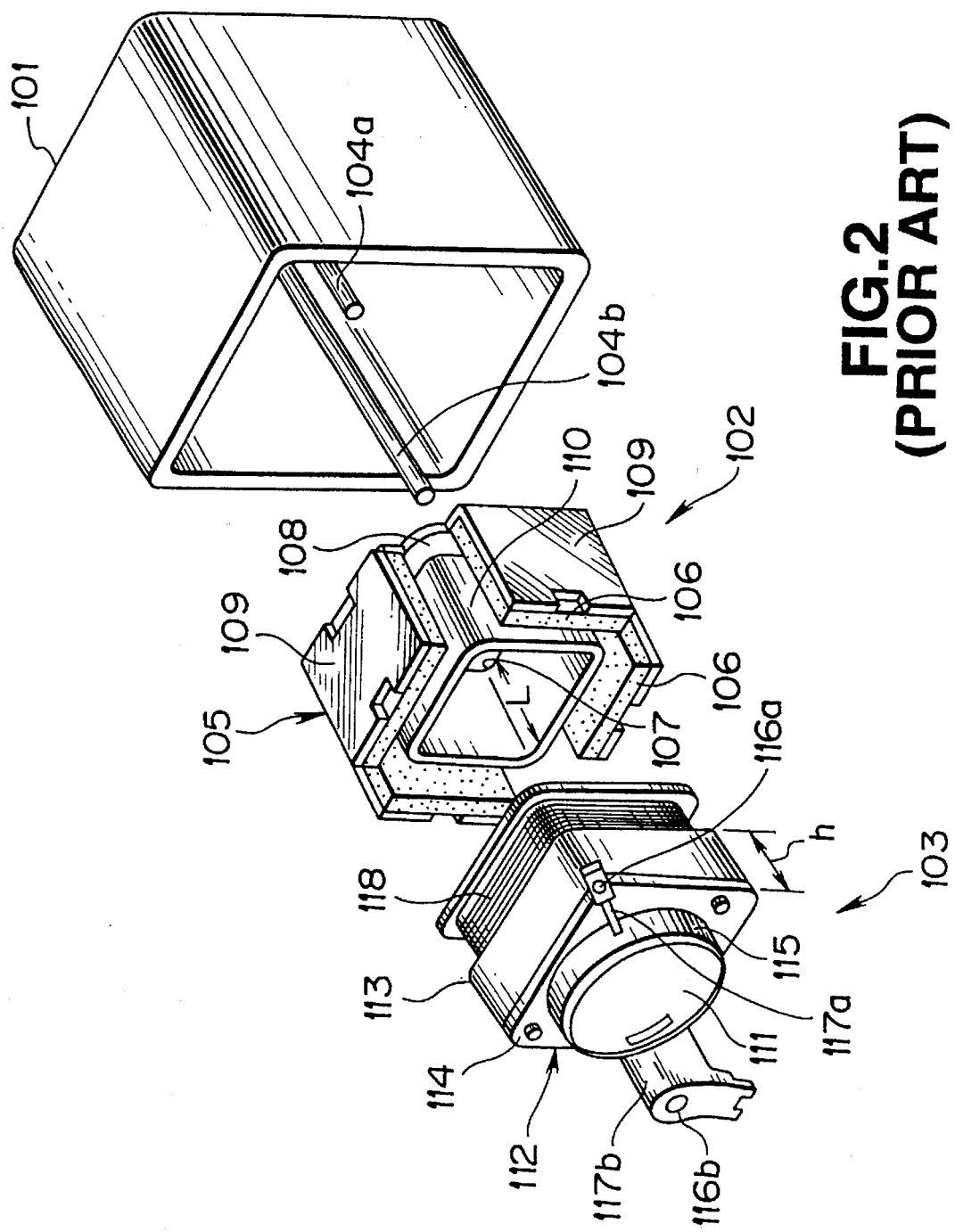
FIG. 2 is an exploded perspective view of a portion of the elements shown in FIG. 1.
Figure 3:
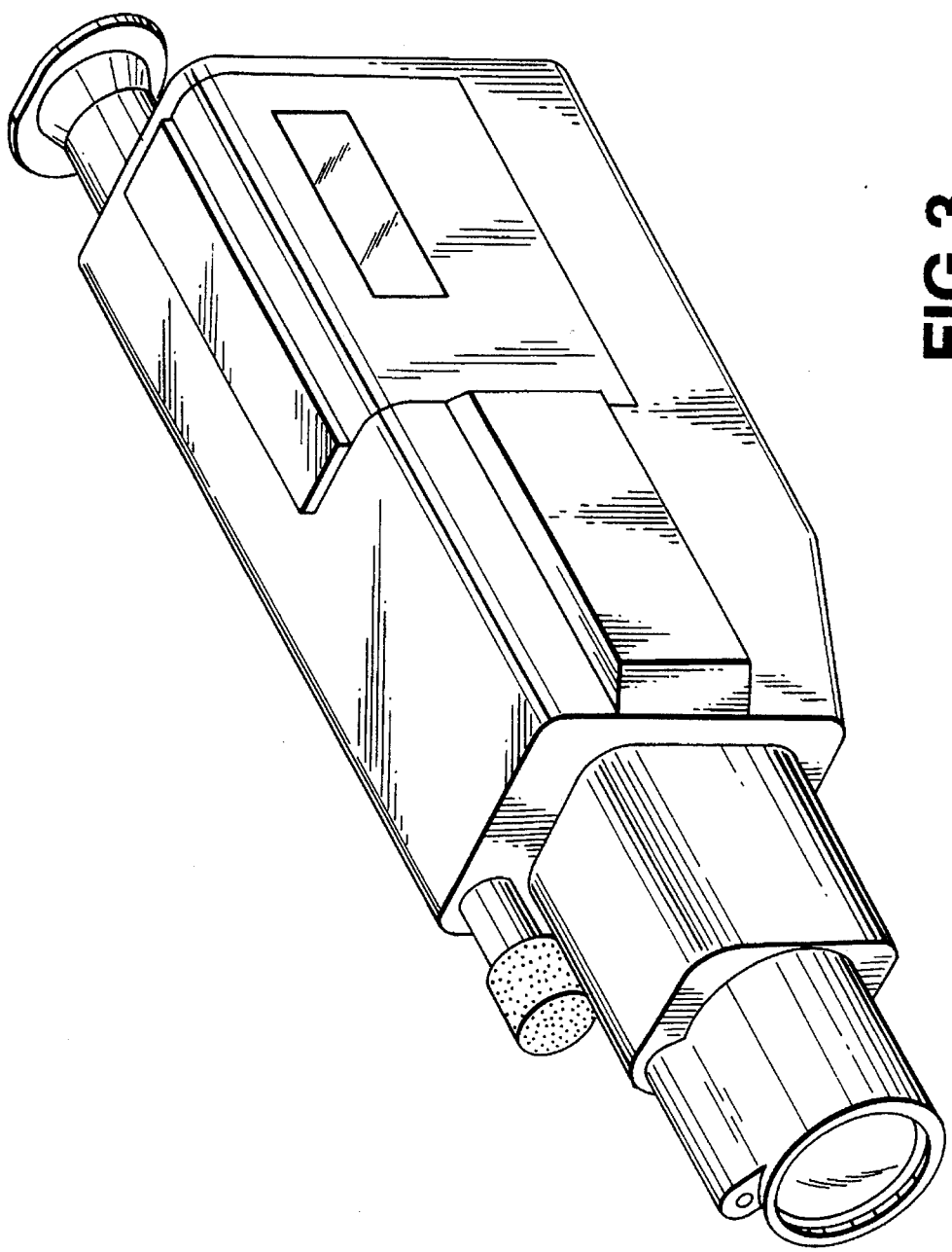
FIG. 3 is a perspective view of a prior art camera in which the lens assembly shown in FIG. 1 is used.

A comparison of the assembly of movable unit 3 within fixed unit 2, as best seen in FIG. 8B, with the assembly of movable unit 103 within fixed unit 102 of the prior art shown in FIG. 2 concludes that the constraint on the range of movement of the prior art is avoided by the present invention. In particular, the abutment of the forward end of the yoke against frame support 114 in the prior art, which limits the rearward movement of the movable unit, is not present in the present invention because the forward end of the yoke simply passes through openings 35 between lens holder 13 and bobbin 14. Moreover, by providing cutout portions at the corners of the rectangular tube-shaped yoke, the overall weight of the yoke assembly is reduced. As a measure of comparison, for the lens of the prior art shown in FIG. 2 to exhibit a range of movement of 10 mm, the overall axial length of fixed unit 102 plus the axial length of frame support 114 is on the order of about 28 mm, whereas with the present invention, the axial length attributed to frame support 114 is omitted, thus resulting in a length of fixed unit 2 of 18 mm to effect the same range of movement of 10 mm.

Figures 9A, 9B:
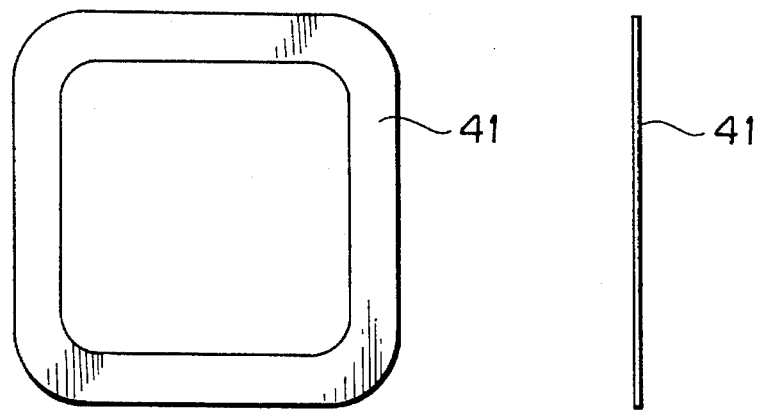
FIGS. 9A and 9B are front and side views of an annular yoke that is included as part of the stator structure shown in FIG. 4.

Since the forward end of the yoke structure of the present invention simply passes through openings 35, as shown in FIG. 8A, the forward ends of the yoke may be interconnected by an annular frame member 41, shown in FIGS. 9A and 9B, thus providing a closed flux path at the forward end of each pair of frame plates, as shown in FIG. 8B. It is appreciated that this annular frame member does not interfere with the axial movement of movable unit 3 and, moreover, since member 41 is an annular frame, there is no interference with the image focused through lens 12. Consequently, the flux path through each outer frame plate 9 and through each inner frame plate 10 is bidirectional because the flux now may pass in one direction to and through connecting plate 8 and in the opposite direction to and through annular frame member 41. As a result, improved magnetic efficiency is obtained. This means that for the same magnetic flux in the gap, that is, for the same magnetic flux linking coil 24 as was used to link coil 118 of the prior art, the thickness of the inner and outer frame plates may be reduced. Therefore, the overall weight of the electromagnetic driving apparatus likewise may be reduced. As an example, the weight of the conventional focusing arrangement shown in FIG. 2 is on the order of about 20 grams, whereas the weight of the focusing arrangement in accordance with the present invention, which achieves the same driving force as in the prior art, is on the order of about 13 grams.

Figure 10:
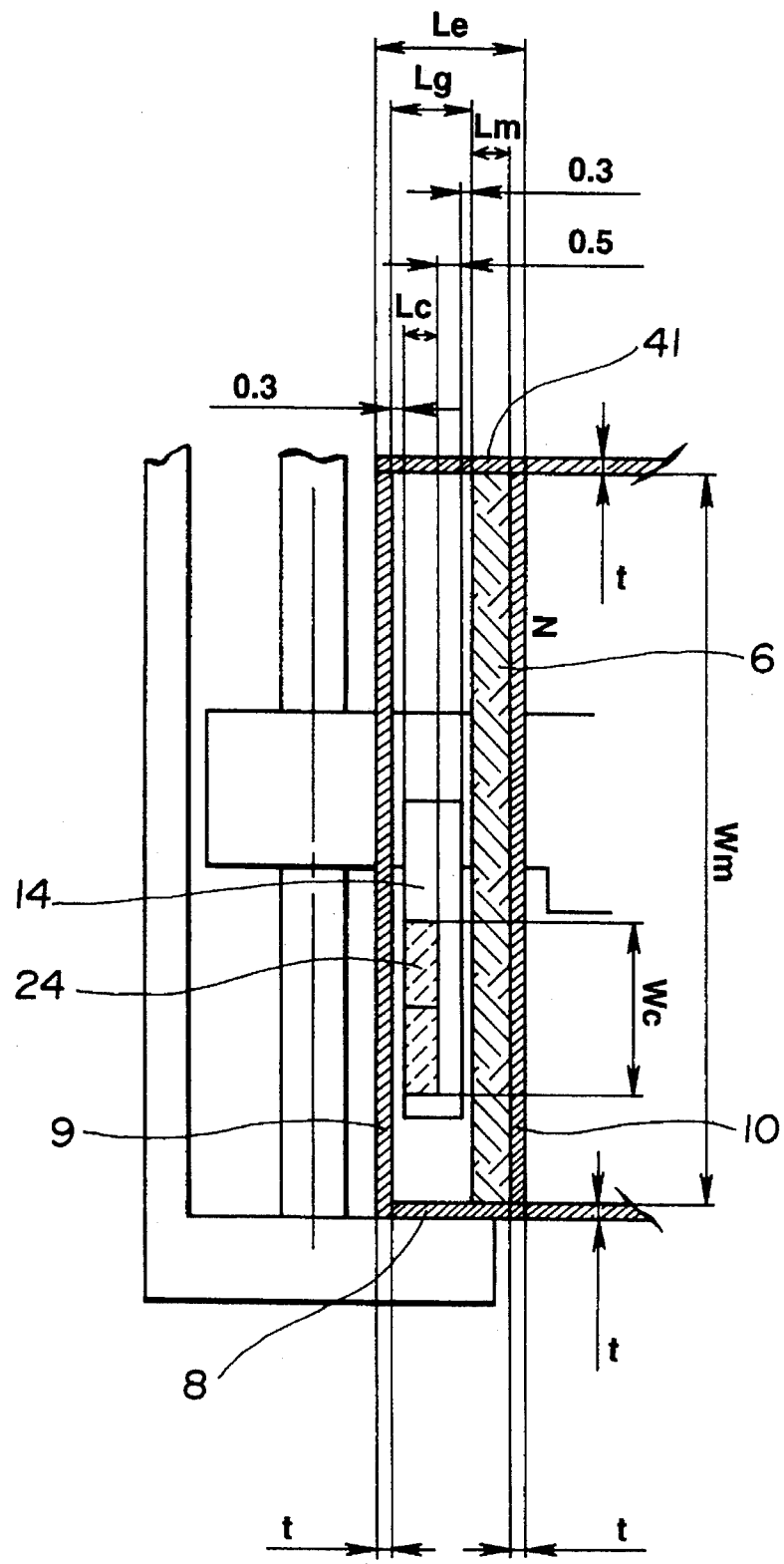
FIG. 10 is a sectional view of a portion of the stator structure shown in FIG. 4.

Referring now to FIG. 10, a portion of the yoke assembly, bobbin 14 and coil 24 is illustrated. In particular, an outer frame plate 9, an inner frame plate 10, a magnet 6, a portion of connecting plate 8 and a portion of annular frame member 41 of the yoke structure are illustrated. Let it be assumed that the thickness of magnet 6 is Lm (mm) and the thickness of the respective plates of the yoke is t. Let it be further assumed that the yoke exhibits substantially uniform characteristics, but that there may be a portion thereof that is most saturable and that the magnetic flux density B of this most saturable portion of the yoke is 1.5 Tesla (T). It is recognized that the yoke refers to the combination of outer frame plate 9, inner frame plate 10, connecting plate 8 and annular frame member 41. Let it be further assumed that:

the thickness of coil 24 is Lc, and as a numerical example, Lc=0.5 mm;

the voltage across coil 24 is Vo, and as a numerical example, Vo=4.5 volts;

the resistance of the coil is Ro, and as a numerical example, Ro=33Ω;

the width of magnet 6 (as best seen in FIG. 6B), and thus of the inner and outer frame plates is Hm, and as a numerical example, Hm=12.6 mm;

the resistivity of the wire used for coil 24 is $1.72 \times 10^{-5} \Omega /$ mm;

the specific gravity of magnet 6 is 7;

the specific gravity of the material constituting the yoke structure is 7.86;

the specific gravity of the wire used as coil 24 is 8.93;

the specific gravity of magnet 22 is 4.9; and the maximum magnetic flux density Bo through the yoke, as generated by magnet 6, is 1.5 T.

Now, assuming that the distance of the gap is Lg+Lm, where Lm is the thickness of the magnet (as a numerical example, Lm=0.2 mm) and Lg is the spacing between magnet 6 and outer frame plate 9, the overall distance between the outer surface of outer frame plate 9 and the inner surface of inner frame plate 10 is Le mm (as a numerical example, Le=4.5 mm), the mean length per turn of coil 24 is RLC mm, the length of magnet 6 is Wm mm, the coefficient of permeance of the yoke is K1 (as a numerical example, K1=1.3), the operating point along its hysteresis loop of the yoke structure is Bd (T) and the magnetic flux in the gap between magnet 6 and outer frame plate 9 is Bg (T), then the following equations are realized:

$$Lg=Le-2\times t-Lm \quad (1)$$

$$Lc=Lg-0.5-0.3-0.3 \quad (2)$$

$$RLC=4\times Hm+2\pi(Lm+0.5\ Lg) \quad (3)$$

$$Pc=(Lm/Lg)\times K1 \quad (4)$$

$$Bd=Br/(1+1.04/Pc) \quad (5)$$

$$B=0.5\times Bd\times Wm/(t\times K1) \quad (6)$$

$$Bg=Bd/K1 \quad (7)$$

The slope of a line from the origin of the hysteresis loop for the material of which frame plates 9 and 10 and connecting plate 8 are made to the magnetic flux Bd at the operating point of the hysteresis loop is Pc, where Pc=B/H. Also, in equation (5) above, the factor "1.04" is the slope of a line that is tangent to the hysteresis loop at the operating point Bd.

Now, if the diameter of the wire used as coil 24 is D1 and the number of turns used to form the coil with a resistance R1 of 33Ω is N1, if the length of coil 24 is Wc (as shown in FIG. 10), and if the thickness of bobbin 14 is 0.4 mm, then $$N1=Lc\times(Wc-0.4\times 2)\times Sf/(\pi\times(D1)^2/4) \quad (8)$$

$$R1=RLC\times N1\times 1.72\times 10^{-5} \quad (9)$$

where Sf is the "space factor" which is a measure of the amount of space in the winding slot of bobbin 14 that is occupied by the wire of coil 24. The space factor Sf may be mathematically expressed as Sf=$(2\pi r^2\times N1)/(a\times b)$, where r is the radius of the wire from which coil 24 is formed, a is the depth of the winding slot of bobbin 14 and b is the width of the winding slot.

The current I1 through coil 24 and the power consumption W of the coil may be found from the following equations:

$$I1=Vo/R1=4.5/33=0.136(A) \quad (10)$$

$$W=Vo\times R1=4.5\times 0.136=0.612\ (W) \quad (11)$$

The thrust in gram-feet generated by current I1 through coil 24 may be found from the following equation:

$$F=Bg\times 4\times Hm\times I1\times N1/9.8 \quad (12)$$

where Hm is the width of magnet 6.

The weight MM of the combination of fixed unit 2 and movable unit 3 may be found as follows: the weight of the yoke structure (exclusive of magnets 6) is designated Myo, the weight of the magnets 6 is Mmg, the weight of coil 24 is Mci, the cumulative weight of lens 12, lens holder 13 and bobbin 14 is designated Mho (which is on the order of about 1 gram), the weight of magnet 22 is designated Mmr such that:

$$Myo=(4\times Hm)\times 2\times(Wm+Le)\times t\times 7.86/1000 \quad (13)$$

$$Mmg=4\times(Hm\times Wm\times Lm)\times 7/1000 \quad (14)$$

$$Mci=\pi\times(D1)^2/4\times RLC\times N1\times 8.93/1000 \quad (15)$$

$$Mmr=2\times 2.5\times Wm\times 4.9/1000 \quad (16)$$

$$Mho=1 \quad (17)$$

$$MM=Myo+Mmg+Mci+Mmr+Mho \quad (18)$$

Now, the thrust per unit weight may be expressed as M1, where:

$$M1=F/MM \quad (19)$$

Figure 11:
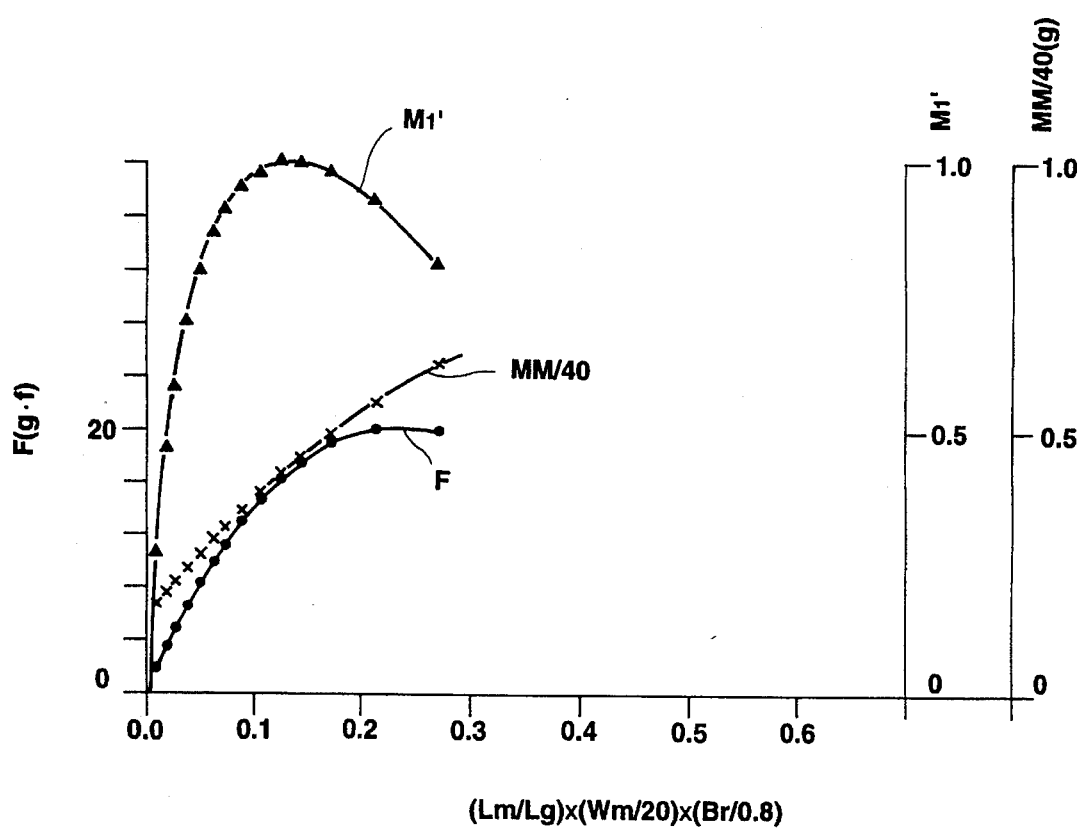
FIGS. 11–15 are graphical representations which are useful in appreciating the improved performance attained by the present invention.

It will be appreciated from the foregoing equations that the thrust per unit weight M1 varies as a function of the thickness Lm of magnet 6. More particularly, the relationship between the thrust per unit weight and the value (Lm/Lg)× (Br/0.8)×(Wm/20) is illustrated in FIG. 11 by the curve M1' where M1' is the thrust per unit weight normalized to a peak of 1.0. In the illustrated curve, Br is the residual magnetic flux density of the magnets and it is assumed that the nominal residual magnetic flux density is 0.8 T. Wm is the length of each magnet (as shown in FIG. 10) and it is assumed that the nominal length of each magnet is 20 mm.

FIG. 11 also illustrates the curve F which depicts changes in the thrust as the thickness Lm of magnet 6 varies; and the curve MM/40 representing the manner in which the weight of the electromagnetic drive apparatus formed of units 2 and 3 varies as the thickness of the magnet is changed (so that the curve MM will appear on the same graph as the curves M1' and F, the curve representing the weight of the electromagnetic drive apparatus is divided by the value 40 simply for scaling purposes).

From FIG. 11, it is seen that desirable thrust per unit weight M1' is generated if the function (Lm/Lg)×(Br/0.8)× (Wm/20) is not less than 0.05 (the curves illustrated in FIG. 11 are not drawn for the function (Lm/Lg)×(Br/0.8)×(Wm/ 20)>0.3 because this is a practical limit for the size of the coil wound on bobbin 14).

Figure 12:
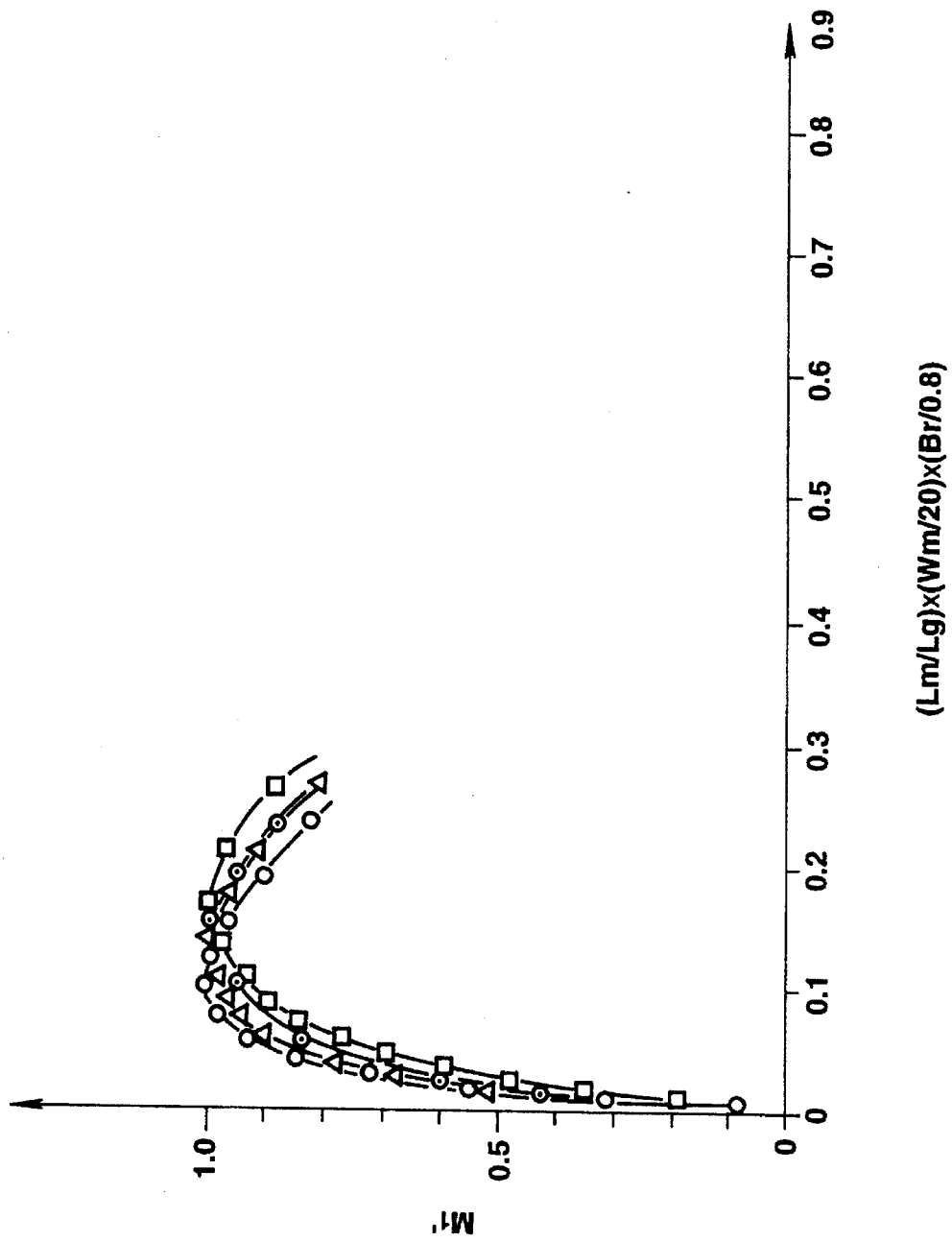

FIG. 12 illustrates the relationship between the generated thrust per unit weight M1 and the function (Lm/Lg)×(Br/ 0.8)×(Wm/20) when the length Wm of magnet 6 changes from 10 mm to 30 mm and the residual magnetic flux density Br of the magnet changes from 0.4 T to 1.2 T. The curve ○ represents changes in the generated thrust per unit weight when Wm=10 mm and Br=0.4 T, the curve △ represents changes in the generated thrust per unit weight when Wm=30 mm and Br=0.4 T, the curve □ represents changes in the generated thrust per unit weight when Wm=10 mm and Br=1.2 T, and the curve ⊙ represents changes in the generated thrust per unit weight when Wm=30 mm and Br=1.2 T. For all of these curves, it is recognized that a desirable thrust per unit weight is generated if the function (Lm/Lg)×(Br/0.8)×(Wm/20) is not less than 0.05.

In a practical application, the thrust F to be generated for moving unit 3 preferably should be on the order of 20 gf. If the overall weight of the electromagnetic driving apparatus, that is, the cumulative weight of fixed unit 2 and movable unit 3, is represented as MM, the weight of this apparatus needed to generate a thrust of 20 gf is represented as MA and may be found from the following equation:

$$MA = (MM/F) \times 20 \qquad (b\ 20)$$

Figure 13:
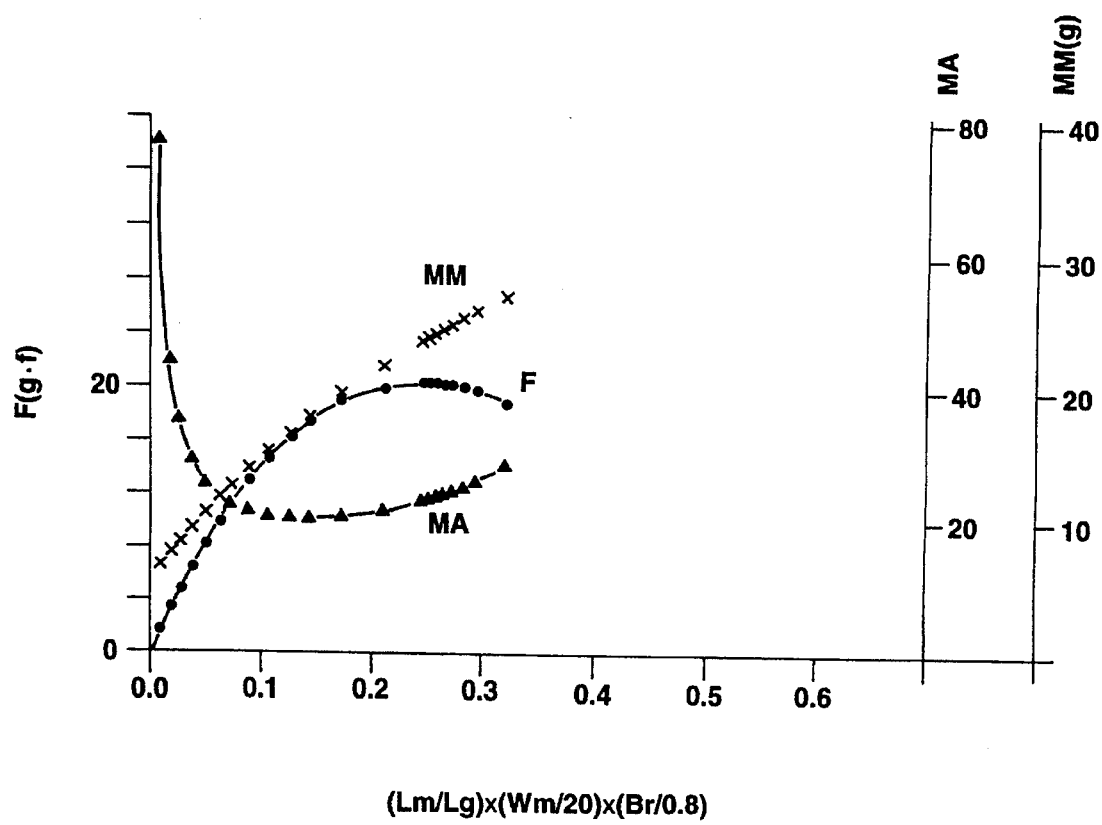

FIG. 13 illustrates the relationship between the weight MA needed to generate a thrust of 20 gf and the function $(Lm/Lg) \times (Br/0.8) \times (Wm/20)$; and also illustrates the relationship between the weight MM of the electromagnetic driving apparatus and this function as well as the relationship between the thrust F generated by this apparatus and said function. In the illustrated curves, the length Wm of magnet 6 and the magnetic flux density Br of the magnet are fixed at 20 mm and 0.8 T, respectively. It is seen from FIG. 13 that if $(Lm/Lg) \times (Br/0.8) \times (Wm/20)$ is not less than 0.05, a desirable value of the weight MA needed to generate a thrust of 20 gf is obtained.

It is appreciated from the foregoing discussion that a satisfactorily high thrust per unit weight M1 may be obtained at a reduced weight MM of the driving apparatus if $(Lm/Lg) \times (Br/0.8) \times (Wm/20)$ is not less than 0.05. Consequently, the overall weight of the drive apparatus used to adjust the lens, as for focusing or zooming adjustments, may be reduced.

The curves illustrated in FIGS. 11–13 are obtained when annular frame member 41 interconnects the forward end portions of the inner and outer frame plates, as in the configuration shown in, for example, FIG. 8B. Nevertheless, it will be appreciated that even if this annular frame member is not used, a satisfactory weight reduction for the driving apparatus is achieved if the function $(Lm/Lg) \times (Br/0.8) \times (Wm/20)$ is not less than 0.05. Of course, if the annular frame member is not provided, the weight Myo of the stator structure, that is, the weight of fixed unit 2, is reduced.

Figure 14:
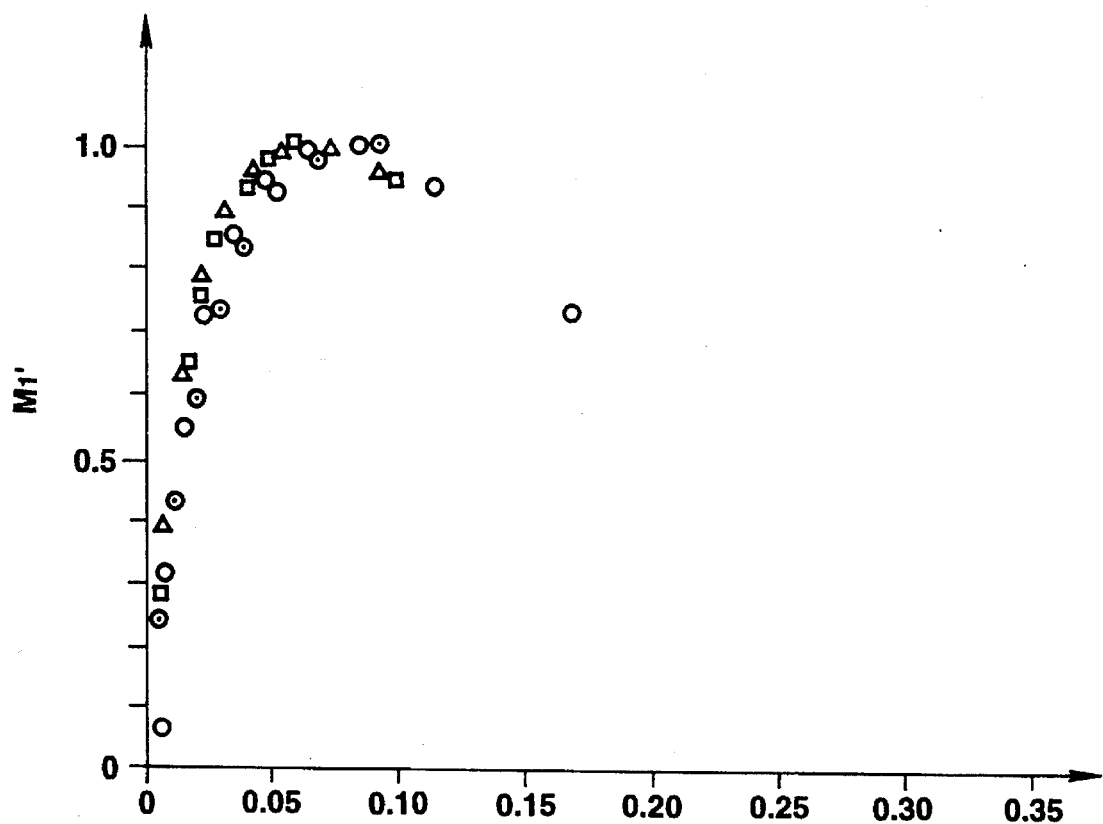

The relationship between changes in the normalized thrust per unit weight M1' as a function of $(Lm/Lg) \times (Br/0.8) \times (Wm/20)$ while the length of magnet Wm changes from 10 mm to 30 mm and while the residual magnetic flux density Br of the magnet changes from 0.4 T to 1.2 T is illustrated in FIG. 14. The curve representing the normalized thrust per unit weight M1' when Wm=10 and Br=0.4T is illustrated as the curve O, the curve representing the normalized thrust per unit weight when Wm=30 mm and Br=0.4 T is illustrated as the curve Δ, the curve representing the normalized thrust per unit weight when Wm=10 mm and Br=1.2 T is illustrated as the curve ⊙, and the curve representing the normalized thrust per unit weight when Wm=30 mm and Br=1.2 T is shown as the curve □. From these four curves, it is appreciated that even though the length of magnet 6 may change from 10 mm to 30 mm and the residual magnetic flux density of the magnet may change from 0.4 to 1.2 T, a desirable thrust per unit weight M1 nevertheless is obtained if the function $(Lm/Lg) \times (Br/0.8) \times (Wm/20)$ is not less than 0.05.

Figure 15:
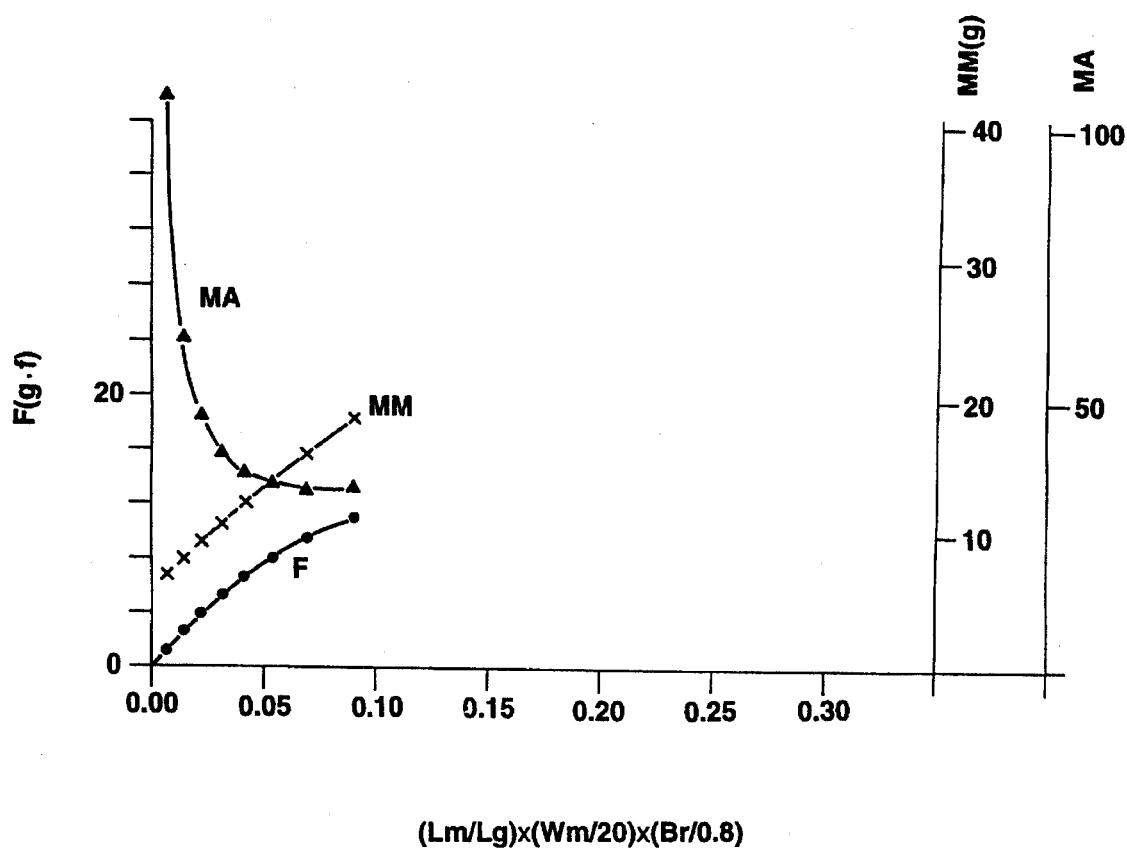

FIG. 15 illustrates the relationships between the weight MA of the driving apparatus needed to generate a thrust of 20 gf, the overall weight MM of the driving apparatus and the thrust F generated by such apparatus as a function of $(Lm/Lg) \times (Br/0.8) \times (Wm/20)$ when annular frame member 41 is not provided in the stator structure. It is seen that the curves shown in FIG. 15 are quite similar to the curves shown in FIG. 13. However, since annular frame member 41 is not used, the residual magnetic flux density Br is reduced. Nevertheless, and as demonstrated by the curves of FIG. 15, even without this annular frame member, desirable thrust F, satisfactorily reduced weight MM and reduced weight MA needed to generate a thrust of 20 gf is obtained if the function $(Lm/Lg) \times (Br/0.8) \times (Wm/20)$ is not less than 0.05. Consequently, the thrust per unit weight M1 may be sufficiently high, resulting in a reduced weight MM needed to generate a desired thrust F.

The foregoing function $(Lm/Lg) \times (Br/0.8) \times (Wm/20)$ has assumed a nominal residual flux density of 0.8 and a nominal magnet length of 20 mm. Because of manufacturing tolerances, it is expected that the residual magnetic flux density of the magnets may vary from one to the other and, similarly, the length of each magnet may not be precisely the same. Consequently, a more accurate function would be $(Lm/Lg) \times (Br/Brx) \times (Wm/Wmx)$, where Brx is the average residual magnetic flux density of all of the magnets and Wmx is the average length of all of the magnets which, as is appreciated, may differ from the nominal values Br=0.8 and Wm=20, respectively. Nevertheless, desirable thrust, satisfactory thrust per unit weight, satisfactory overall weight and satisfactory weight to produce a thrust of 20 gf all are obtained if $(Lm/Lg) \times (Br/Brx) \times (Wm/Wmx) \geq 0.05$.

While the present invention has been particularly shown and described with reference to a preferred embodiment, it will be readily appreciated by those of ordinary skill in the art that various changes and modifications may be made without departing from the spirit and scope of the invention. For example, by using the voice coil motor arrangement of the present invention, the driven member, such as lens 12 and lens holder 13, may be moved over a longer distance by driving apparatus whose weight is equal to or less than the weight of the prior art driving apparatus shown in, for example, FIG. 2.

Also, it will be appreciated that although two shafts of circular cross-section are shown in FIG. 4, shafts having different cross-sections may be used. Also, and if desired, only a single shaft may be provided.

It is intended that the appended claims be interpreted as covering the embodiment described herein, those alternatives which have been discussed above and all equivalents thereto.

What is claimed is:

1. Linear electromagnetic driving apparatus comprising stator means including a substantially rectangular tube-shaped magnetic yoke comprised of outer frame plates, inner frame plates spaced from and facing said outer frame plates to form a gap therebetween, a connecting member for connecting the outer and inner frame plates and providing a magnetic flux path therethrough and at least one magnet secured to one of said outer and inner frame plates to generate said magnetic flux, said rectangular tube-shaped magnetic yoke having a longitudinal axis and also having corners, at least one of said corners being cut out to define an open portion; movable means slidable within said gap between said outer and inner frame plates and including a drive member comprised of a bobbin positioned within said gap and a coil wound on said bobbin and extending in a direction parallel to said longitudinal axis, a driven member secured to and coaxial with said bobbin and having openings to receive said inner frame plates of said yoke means such that when said coil is energized to move said movable means in said gap, said inner frame plates extend into and through said bobbin and into and through the openings of said driven member; a fixed shaft extending parallel to said longitudinal axis of the rectangular tube-shaped magnetic yoke; and bearing means secured to said movable means and extending outwardly therefrom substantially perpendicular to said longitudinal axis and passing through the open portion of said at least one corner of said rectangular tube-shaped magnetic yoke, said bearing means receiving and being slidable on said fixed shaft.

2. The apparatus of claim 1 wherein said yoke is further comprised of an annular frame member coupled to end portions of said outer and inner frame plates remote from said connecting member, said annular frame member providing a magnetic flux connection between said outer and inner frame plates and establishing a magnetic flux path therethrough.

3. The apparatus of claim 1 further comprising position detecting means coupled to said movable means for detecting the position of said movable means relative to said stator means.

4. The apparatus of claim 3 wherein said position detecting means comprises a magnet and a sense coil, one of which is fixed and the other of which is secured to said bearing means and is positioned externally of said rectangular tube-shaped magnetic yoke, whereby movement of said movable means results in relative movement between the magnet and sense coil of said detecting means.

5. The apparatus of claim 4 wherein said sense coil is fixedly positioned externally of said rectangular tube-shaped magnetic yoke and the magnet of said detecting means is secured to said bearing means opposite said sense coil and movable therepast.

6. The apparatus of claim 1 wherein said outer frame plates form a substantially rectangular outer frame structure, said inner frame plates form a substantially rectangular inner frame structure, each of said inner and outer frame plates having a respective surface parallel to said longitudinal axis and forming a respective pair of frame plates, and one magnet being secured to one surface of each pair of said frame plates.

7. The apparatus of claim 6 wherein each magnet is disposed in said gap with one surface thereof secured to one of the frame plates of a respective pair and the other surface thereof facing the other frame plate of said pair.

8. The apparatus of claim 7 wherein each magnet exhibits a thickness Lm (mm), a length Wm (mm) extending in a direction parallel to said longitudinal axis and a residual flux density Br (Tesla); wherein the gap has a length Lg (mm); the average residual flux density of said magnets is Brx (Tesla) and the average length of said magnets is Wmx (mm); and wherein $(Lm/Lg) \times (Br/Brx) \times (Wm/Wmx) \geq 0.05$.

9. The apparatus of claim 2 wherein said outer frame plates form a substantially rectangular outer frame structure; said inner frame plates form a substantially rectangular inner frame structure; each of said inner and outer frame plates having a respective surface parallel to said longitudinal axis and forming a respective pair of frame plates, one magnet being secured to one surface of each pair of frame plates and being disposed in said gap, said magnet having a thickness Lm (mm), a length extending parallel to said longitudinal axis Wm (mm) and a residual flux density Br (Tesla), said gap having a length Lg (mm); the average residual flux density of said magnets being Brx (Tesla); the average length of said magnets being Wmx (mm); and wherein $(Lm/Lg) \times (Br/Brx) \times (Wm/Wmx) \geq 0.05$.

10. The apparatus of claim 1 wherein said outer frame plates are integral with said connecting member, the latter having a substantially rectangular opening the perimeter of which is secured to said inner frame plates.

11. The apparatus of claim 10 wherein said driven member is suspended from said bobbin in a radially inward direction.

12. The apparatus of claim 1 further comprising a second fixed shaft parallel to the first-mentioned shaft, and second bearing means secured to said movable means and extending outwardly therefrom, passing through the open portion of another corner of said rectangular tube-shaped magnetic yoke, and receiving said second fixed shaft.

13. The apparatus of claim 12 wherein said first and second fixed shafts are disposed externally of said rectangular tube-shaped magnetic yoke.

14. Electromagnetically driven focusing apparatus comprising stator means including a substantially rectangular tube-shaped magnetic yoke comprised of outer frame plates, inner frame plates spaced from and facing said outer frame plates to form a gap therebetween, a connecting member for connecting the outer and inner frame plates and providing a magnetic flux path therethrough and at least one magnet secured to one of said outer and inner frame plates to generate said magnetic flux, said rectangular tube-shaped magnetic yoke having a longitudinal axis and also having corners, at least one of said corners being cut out to define an open portion; movable means slidable within said gap between said outer and inner frame plates and including a drive member comprised of a bobbin positioned within said gap and a coil wound on said bobbin and extending in a direction parallel to said longitudinal axis, lens holding means secured to and coaxial with said bobbin for holding a lens and having openings to receive said inner frame plates of said yoke means such that when said coil is energized to move said movable means in said gap, said inner frame plates extend into and through said bobbin and into and through the openings of said lens holding means; a fixed shaft extending parallel to said longitudinal axis of the rectangular tube-shaped magnetic yoke; and bearing means secured to said movable means and extending outwardly therefrom substantially perpendicular to said longitudinal axis and passing through the open portion of said at least one corner of said rectangular tube-shaped magnetic yoke, said bearing means receiving and being slidable on said fixed shaft.

15. The apparatus of claim 14 wherein said yoke is further comprised of an annular frame member coupled to end portions of said outer and inner frame plates remote from said connecting member, said annular frame member providing a magnetic flux connection between said outer and inner frame plates and establishing a magnetic flux path therethrough.

16. The apparatus of claim 14 further comprising position detecting means coupled to said movable means for detecting the position of said movable means relative to said stator means.

17. The apparatus of claim 16 wherein said position detecting means comprises a magnet and a sense coil, one of which is fixed and the other of which is secured to said bearing means and is positioned externally of said rectangular tube-shaped magnetic yoke, whereby movement of said movable means results in relative movement between the magnet and sense coil of said detecting means.

18. The apparatus of claim 17 wherein said sense coil is fixedly positioned externally of said rectangular tube-shaped magnetic yoke and the magnet of said detecting means is secured to said bearing means opposite said sense coil and movable therepast.

19. The apparatus of claim 14 wherein said outer frame plates form a substantially rectangular outer frame structure, said inner frame plates form a substantially rectangular inner frame structure, each of said inner and outer frame plates having a respective surface parallel to said longitudinal axis and forming a respective pair of frame plates, and one magnet being secured to one surface of each pair of said frame plates.

20. The apparatus of claim 19 wherein each magnet is disposed in said gap with one surface thereof secured to one of the frame plates of a respective pair and the other surface thereof facing the other frame plate of said pair.

21. The apparatus of claim 20 wherein each magnet exhibits a thickness Lm (mm), a length Wm (mm) extending in a direction parallel to said longitudinal axis and a residual magnetic flux density Br (Tesla); wherein the gap has a length Lg (mm); and wherein $(Lm/Lg) \times (Br/0.8) \times (Wm/20) \geq 0.05$.

22. The apparatus of claim 15 wherein said outer frame plates form a substantially rectangular outer frame structure; said inner frame plates form a substantially rectangular inner frame structure; each of said inner and outer frame plates having a respective surface parallel to said longitudinal axis and forming a respective pair of frame plates, one magnet being secured to one surface of each pair of frame plates and being disposed in said gap, said magnet having a thickness Lm (mm) a length extending parallel to said longitudinal axis Wm (mm) and a residual flux density Br (Tesla); wherein the gap has a length Lg (mm); and wherein $(Lm/Lg) \times (Br/0.8) \times (Wm/20) \geq 0.05$.

23. The apparatus of claim 14 wherein said outer frame plates are integral with said connecting member, the latter having a substantially rectangular opening the perimeter of which is secured to said inner frame plates.

24. The apparatus of claim 23 wherein said lens holding means is suspended from said bobbin in a radially inward direction.

25. The apparatus of claim 14 further comprising a second fixed shaft parallel to the first-mentioned shaft, and second bearing means secured to said movable means and extending outwardly therefrom, passing through the open portion of another corner of said rectangular tube-shaped magnetic yoke, and receiving said second fixed shaft.

26. The apparatus of claim 25 wherein said first and second fixed shafts are disposed externally of said rectangular tube-shaped magnetic yoke.

27. Lens drive apparatus for moving a lens in a camera comprising stator means including a substantially rectangular tube-shaped magnetic yoke comprised of outer frame plates, inner frame plates spaced from and facing said outer frame plates to form a gap therebetween, a connecting member for connecting the outer and inner frame plates and providing a magnetic flux path therethrough and at least one magnet secured to one of said outer and inner frame plates to generate said magnetic flux, said rectangular tube-shaped magnetic yoke having a longitudinal axis and also having corners, at least one of said corners being cut out to define an open portion; movable means slidable within said gap between said outer and inner frame plates and including a drive member comprised of a bobbin positioned within said gap and a coil wound on said bobbin and extending in a direction parallel to said longitudinal axis, lens holding means secured to and coaxial with said bobbin for holding a lens and having openings to receive said inner frame plates of said yoke means such that when said coil is energized to move said movable means in said gap, said inner frame plates extend into and through said bobbin and into and through the openings of said lens holding means; a fixed shaft extending parallel to said longitudinal axis of the rectangular tube-shaped magnetic yoke; and bearing means secured to said movable means and extending outwardly therefrom substantially perpendicular to said longitudinal axis and passing through the open portion of said at least one corner of said rectangular tube-shaped magnetic yoke, said bearing means receiving and being slidable on said fixed shaft.

28. The apparatus of claim 27 wherein said yoke is further comprised of an annular frame member coupled to end portions of said outer and inner frame plates remote from said connecting member, said annular frame member providing a magnetic flux connection between said outer and inner frame plates and establishing a magnetic flux path therethrough.

29. The apparatus of claim 27 further comprising position detecting means coupled to said movable means for detecting the position of said movable means relative to said stator means.

30. The apparatus of claim 29 wherein said position detecting means comprises a magnet and a sense coil, one of which is fixed and the other of which is secured to said bearing means and is positioned externally of said rectangular tube-shaped magnetic yoke, whereby movement of said movable means results in relative movement between the magnet and sense coil of said detecting means.

31. The apparatus of claim 30 wherein said sense coil is fixedly positioned externally of said rectangular tube-shaped magnetic yoke and the magnet of said detecting means is secured to said bearing means opposite said sense coil and movable therepast.

32. The apparatus of claim 27 wherein said outer frame plates form a substantially rectangular outer frame structure, said inner frame plates form a substantially rectangular inner frame structure, each of said inner and outer frame plates having a respective surface parallel to said longitudinal axis and forming a respective pair of frame plates, and one magnet being secured to one surface of each pair of said frame plates.

33. The apparatus of claim 32 wherein each magnet is disposed in said gap with one surface thereof secured to one of the frame plates of a respective pair and the other surface thereof facing the other frame plate of said pair.

34. The apparatus of claim 33 wherein each magnet exhibits a thickness Lm (mm), a length Wm (mm) extending in a direction parallel to said longitudinal axis and a residual magnetic flux density Br (Tesla); wherein the gap has a length Lg (mm); and wherein $(Lm/Lg) \times (Br/0.8) \times (Wm/20) \geq 0.05$.

35. The apparatus of claim 28 wherein said outer frame plates form a substantially rectangular outer frame structure; said inner frame plates form a substantially rectangular inner frame structure; each of said inner and outer frame plates having a respective surface parallel to said longitudinal axis and forming a respective pair of frame plates, one magnet being secured to one surface of each pair of frame plates and being disposed in said gap, said magnet having a thickness Lm (mm) a length extending parallel to said longitudinal axis Wm (mm) and a residual flux density Br (Tesla); wherein the gap has a length Lg (mm); and wherein $(Lm/Lg) \times (Br/0.8) \times (Wm/20) \geq 0.05$.

36. The apparatus of claim 27 wherein said outer frame plates are integral with said connecting member, the latter having a substantially rectangular opening the perimeter of which is secured to said inner frame plates.

37. The apparatus of claim 36 wherein said lens holding means is suspended from said bobbin in a radially inward direction.

38. The apparatus of claim 27 further comprising a second fixed shaft parallel to the first-mentioned shaft, and second bearing means secured to said movable means and extending outwardly therefrom, passing through the open portion of another corner of said rectangular tube-shaped magnetic yoke, and receiving said second fixed shaft.

39. The apparatus of claim 38 wherein said first and second fixed shafts are disposed externally of said rectangular tube-shaped magnetic yoke.

* * * * *

UNITED STATES PATENT AND TRADEMARK OFFICE
CERTIFICATE OF CORRECTION

PATENT NO. : 5,471,100
DATED : Nov. 28, 1995
INVENTOR(S) : Satoshi Sakamoto; Shinichi Orimo It is certified that error appears in the above-identified patent and that said Letters Patent is hereby corrected as shown below:

On title page, item [30],

Add to Foreign Application Priority Data

-- Sep. 30, 1993  [JP]  Japan  ........ 5-245746 --

Signed and Sealed this

Twenty-sixth Day of March, 1996

Attest:

BRUCE LEHMAN

*Attesting Officer*  *Commissioner of Patents and Trademarks*